US010861436B1

(12) United States Patent
Scodary et al.

(10) Patent No.: US 10,861,436 B1
(45) Date of Patent: Dec. 8, 2020

(54) AUDIO CALL CLASSIFICATION AND SURVEY SYSTEM

(71) Applicant: Gridspace Inc., Menlo Park, CA (US)

(72) Inventors: Anthony Scodary, Los Angeles, CA (US); Nicolas Benitez, Los Angeles, CA (US); Evan Macmillan, Menlo Park, CA (US)

(73) Assignee: Gridspace Inc., Menlo Park, CA (US)

( * ) Notice: Subject to any disclaimer, the term of this patent is extended or adjusted under 35 U.S.C. 154(b) by 131 days.

(21) Appl. No.: 15/653,411

(22) Filed: Jul. 18, 2017

Related U.S. Application Data

(60) Provisional application No. 62/378,778, filed on Aug. 24, 2016.

(51) Int. Cl.
*G10L 15/02* (2006.01)
*G10L 15/18* (2013.01)
*G10L 15/05* (2013.01)
*G06F 16/683* (2019.01)

(52) U.S. Cl.
CPC ............ *G10L 15/02* (2013.01); *G06F 16/683* (2019.01); *G10L 15/05* (2013.01); *G10L 15/1815* (2013.01)

(58) Field of Classification Search
CPC ..... G10L 15/22; G10L 15/1815; G10L 15/26; G10L 17/26; G10L 15/18; G10L 15/1807; G10L 15/1822; G10L 15/183; G10L 25/51; G10L 25/63; G10L 15/00; G10L 15/08
See application file for complete search history.

(56) References Cited

U.S. PATENT DOCUMENTS

| | | | | |
|---|---|---|---|---|
| 5,918,222 A * | 6/1999 | Fukui | .................... | G06Q 10/10 |
| 8,972,243 B1 * | 3/2015 | Strom | .................. | G10L 15/193 |
| | | | | 704/1 |
| 10,332,508 B1 * | 6/2019 | Hoffmeister | ............ | G10L 15/16 |
| 2005/0246165 A1 * | 11/2005 | Pettinelli | ............. | G10L 15/1807 |
| | | | | 704/207 |
| 2010/0036660 A1 * | 2/2010 | Bennett | ................... | G10L 15/30 |
| | | | | 704/231 |
| 2011/0238407 A1 * | 9/2011 | Kent | ..................... | G06F 17/289 |
| | | | | 704/3 |
| 2013/0185057 A1 * | 7/2013 | Yoon | ....................... | G06F 17/24 |
| | | | | 704/9 |
| 2013/0262096 A1 * | 10/2013 | Wilhelms-Tricarico | ..................... | |
| | | | | G10L 25/90 |
| | | | | 704/202 |
| 2014/0112556 A1 * | 4/2014 | Kalinli-Akbacak | .... | G10L 25/63 |
| | | | | 382/128 |
| 2014/0180675 A1 * | 6/2014 | Neuhauser | .............. | G06F 17/28 |
| | | | | 704/9 |
| 2014/0249799 A1 * | 9/2014 | Yih | ....................... | G06F 17/277 |
| | | | | 704/9 |
| 2015/0012271 A1 * | 1/2015 | Peng | ....................... | G10L 15/08 |
| | | | | 704/235 |
| 2015/0066496 A1 * | 3/2015 | Deoras | ................... | G10L 15/16 |
| | | | | 704/232 |

(Continued)

Primary Examiner — Richemond Dorvil
Assistant Examiner — Mark Villena
(74) Attorney, Agent, or Firm — Rowan TELS LLC

(57) ABSTRACT

A method whereby an audio content is analyzed for speech semantic content and speech vocal content to determine audio content metrics. Additionally, the method may also incorporate the similarity of the audio content to other audio contents and weight the analyses to determine audio content metrics.

4 Claims, 12 Drawing Sheets

(56) References Cited

U.S. PATENT DOCUMENTS

| | | | | |
|---|---|---|---|---|
| 2015/0179170 A1* | 6/2015 | Sarikaya | ............... | G10L 15/22 |
| | | | | 704/275 |
| 2016/0316059 A1* | 10/2016 | Nuta | ................. | G10L 15/063 |
| 2016/0337776 A1* | 11/2016 | Breebaart | ........... | F24C 15/2028 |
| 2016/0352902 A1* | 12/2016 | Raanani | ................ | G06Q 30/02 |
| 2016/0379632 A1* | 12/2016 | Hoffmeister | .......... | G10L 15/18 |
| | | | | 704/253 |
| 2017/0013124 A1* | 1/2017 | Havelka | ............. | H04M 3/5235 |
| 2017/0047063 A1* | 2/2017 | Ohmura | ................. | G10L 15/22 |
| 2018/0052842 A1* | 2/2018 | Hewavitharana | ... | G06F 17/2705 |

* cited by examiner

AUDIO CALL CLASSIFICATION AND SURVEY SYSTEM

CROSS-REFERENCE TO RELATED APPLICATIONS

This application claims benefit under 35 U.S.C. 119 to U.S. application Ser. No. 62/378,778, filed on Aug. 24, 2016, and incorporated herein by reference in its entirety.

BACKGROUND

Many call systems have sparse data about as to which calls went well across their tracked metrics. Common metrics include quality metrics, such as was a successful outcome reached, was the call agent competent, etc., and matching human survey results, such as quality assurance audits, customer survey results, etc. In general, to determine these metrics, humans listen to and manually provide feedback, which may be cost ineffective and time consuming.

A system that analyzes audio for semantic and vocal content may measure a useful set of metrics with cost and time savings.

BRIEF SUMMARY

The method and system extracts useful metrics from spoken conversation, using call grading and call similarity. Call grading extracts important metrics from audio using a combination of direct audio content analysis (how things are said) and analysis of the speech content (words spoken). For the majority of the calls, there are enough examples of that exact type of call (subject, quality, outcome) to very effectively determine the audio and speech aspects of that type of call. For the minority of calls, there may be factors that are relatively rare among the dataset, and extraction of useful metrics may be difficult using call grading alone. In such cases, metrics are retrieved from a similar call to serve as a surrogate. The call grading and call similarity are then weighted, improving confidence in the scoring.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Model Compatibility

Figure 1:
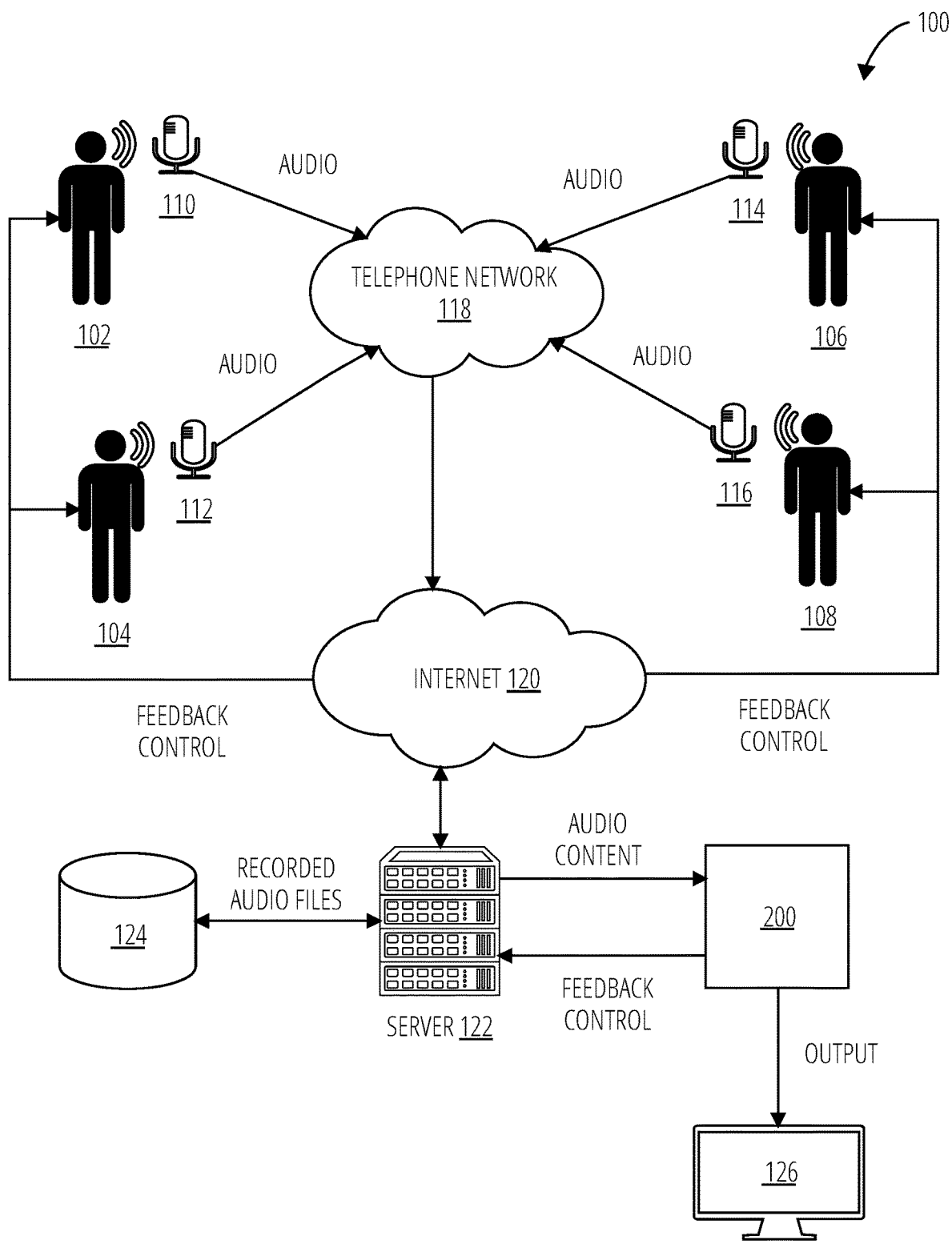
FIG. 1 illustrates an embodiment of an audio environment 100.

To ensure that the direct call grading and call similarity may be used together and averaged, each system may use the same metrics and be on the same scale. The exact same dataset may be used. If the systems are compatible, they may be used together to track longitudinal histories for audio content with the same person. They may also be used in aggregate to track organizational metrics.

Compatibility may also be a concern of the system as the system may be continually trained over time. If the rubrics used to provide human labels change, there may be a temporal bias in the model control structure. Or in severe cases, the model control structure may start to return much less accurate predictions.

Partial Retraining

In the case that a small dataset may be available to retrain an existing system to a new set of metrics, the bulk of old system may be "freezed" and the final stage of the system may be trained. The original system, in later stages may have a bottleneck stage wherein the system may provide a rich encoding of the audio content before the final predictions. The bottleneck, typically a low-dimensional vector in the system, may be of limited size and, therefore, may efficiently and compactly describe the audio content before providing the final "human-readable" output. See FIG. 6.

That final transformation, from bottleneck stage to final predictions may often be <1% of the model control structure complexity (and free parameters). As a result, the conversion may be taught with a very small number of examples. This allows the system to be reused across changing needs quickly and efficiently. In some cases, the bottleneck stage may be a useful output that may be used by organizations.

Applications

Call grading may be used in any application where audio content may be analyzed for both semantic and vocal content to measure some set of metrics. Ideal use cases include call centers, conference call systems, internal company meetings, fraud detection, employee training, sales, organizational or legal compliance, and education evaluation.

Human speech differs tremendously across domains, cultures, and pretext and all applications may have systems be rebuilt while adhering to the same architecture. Depending the source of audio content, the preconditioning, transcription, and embedding systems may be rebuilt on data from the relevant domains.

However, in some cases, output metrics may be chosen to be general enough to be useful across many different applications, either at the final or bottleneck stage.

The disclosed method and apparatus physically transform received audio content into a structured graphical interface on a machine, such as a light-emitting device. The structure graphical interface may comprise a grade associated with the audio content received, the displayed grade being useful, concrete, and tangible transformation of the received audio content. The audio content may represent physical characteristics emitted by a sound producing device, such as a human emitting speech, the physical characteristics including the words spoken and how those words were spoken, and the structure graphical interface of the machine display is a transformation representing those physical characteristics.

The disclosed method and apparatus also improves the computerization of a technological process. The disclosed method and apparatus utilize a technique that improves the computerization of applying a grade-generating model on sensed computerized audio content to configure the surface of a machine display with a structured graphical interface. The claimed technique is particular to and improves the computerization of this process at least because the audio content is divided by a machine processor into at least two parts, the speech semantic content and the speech vocal content, each of which is then transformed into a vector that may be combined to provide an input, which may be a dense vector, to the grade-generating model.

The disclosed method and apparatus focus on a specific improvements in computer capabilities. Specifically, by utilizing multiple model control structures and weighting the results for identifying the speech semantic content from the audio content (e.g., operating a digital filter specific to computerized processing of digital audio), identifying the speech vocal content from the audio content (another digital filter), and determining the model control structure from the combined message content, the accuracy, reliability, and quality of the resulting output is increased. The disclosed method and apparatus also improve the processing speed of a large set by selecting the audio content to which to determine similar audio content, which if applied may also improve the accuracy, reliability, and quality of the resulting computer processing.

The disclosed method and apparatus provide a particular technological solution to a technological problem, utilizing a slot of a neural network to emphasize (e.g., enhance) a portion of the received audio content, resulting in an enhanced analysis of portions of the audio content that are determined to be more important to the grade.

Referring to FIG. 1, the audio environment 100 comprises a first audio provider 102, a second audio provider 104, a third audio provider 106, a fourth audio provider 108, a first audio transmitting device 110, a second audio transmitting device 112, a third audio transmitting device 114, a fourth audio transmitting device 116, a telephone network 118, an internet 120, a server 122, an audio files control memory structure 124, a machine display 126, and an audio analysis system 200.

The first audio provider 102, the second audio provider 104, the third audio provider 106, and the fourth audio provider 108 produce speech, which may be converted to audio. The first audio provider 102, the second audio provider 104, the third audio provider 106, and the fourth audio provider 108 may be a human, a machine configured to produce speech, or other structure capable of producing speech.

The first audio transmitting device 110, the second audio transmitting device 112, the third audio transmitting device 114, and the fourth audio transmitting device 116 receive the speech from the first audio provider 102, the second audio provider 104, the third audio provider 106, and the fourth audio provider 108, respectively. An audio transmitting device may receive speech from one or more audio providers. The first audio transmitting device 110, the second audio transmitting device 112, the third audio transmitting device 114, and the fourth audio transmitting device 116 transform the speech into audio and send the audio to the telephone network 118. Each audio transmitting device may comprise a receiver to convert the sound wave associated with the speech to a electronic signal (i.e., the audio).

The telephone network 118 receives the audio from each of the audio transmitting devices and sends the audio via the internet 120, to the server 122. Each audio may be associated with one or more other audio.

The server 122 receives the audio and may send the audio, as recorded audio files, to the audio files control memory structure 124. The server 122 may also send audio content to the audio analysis system 200.

The audio analysis system 200 receives the audio content and generates an output that is sent to the machine display 126 and/or a feedback control, which may be sent to the server 122. The feedback control may also be sent to one or more of the audio providers to alter the generation of the speech.

Figure 2:
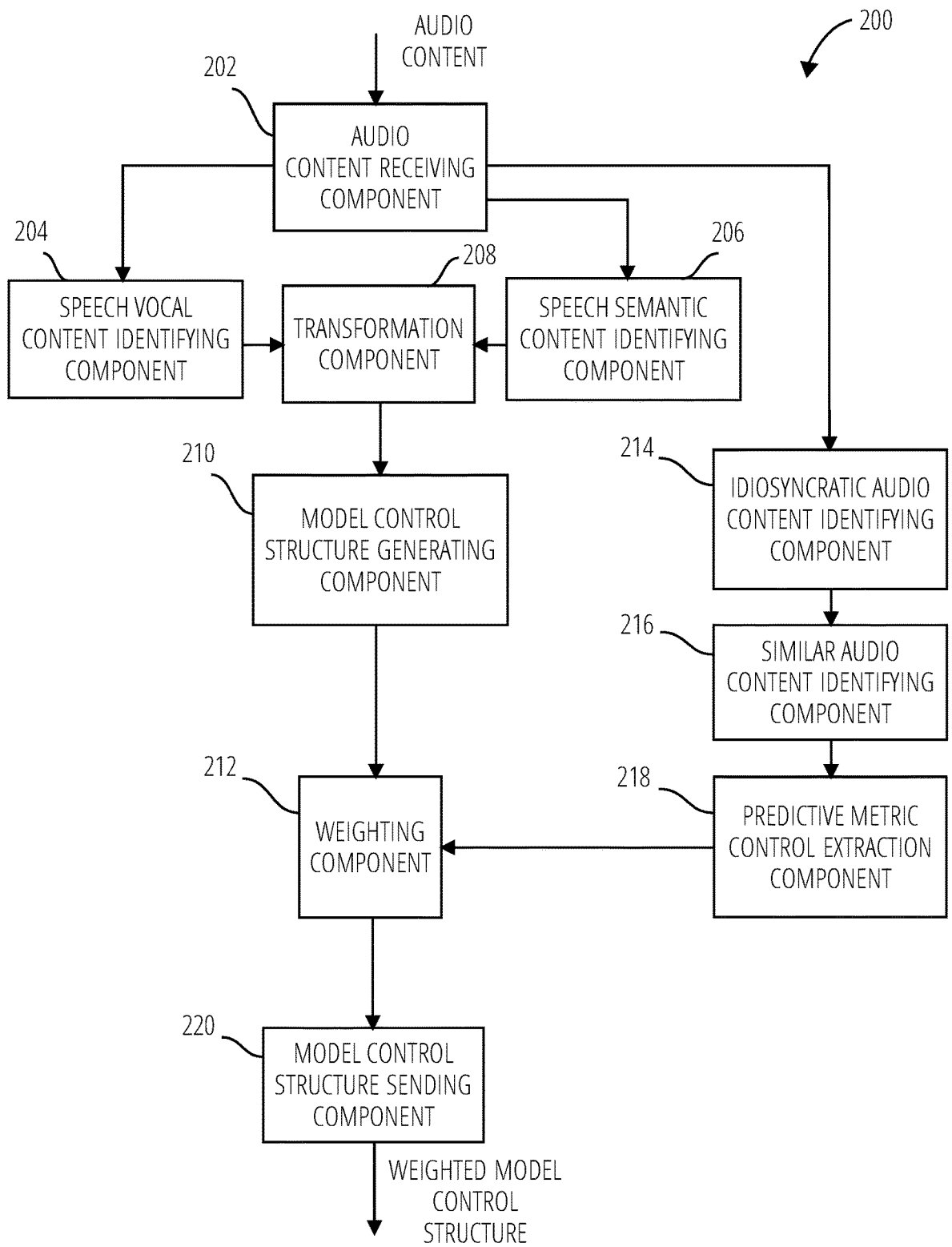
FIG. 2 illustrates an embodiment of an audio analysis system 200.

Referring to FIG. 2, the audio analysis system 200 comprises an audio content receiving component 202, a speech vocal content identifying component 204, a speech semantic content identifying component 206, a transformation component 208, a model control structure generating component 210, a weighting component 212, an idiosyncratic audio content identifying component 214, a similar audio content identifying component 216, a predictive metric control extraction component 218, and a model control structure sending component 220.

The audio content receiving component 202 may receive an audio content of human speech as an input. The audio content is sent to the speech vocal content identifying component 204, the speech semantic content identifying component 206, and the idiosyncratic audio content identifying component 214.

The speech vocal content identifying component 204 receives the audio content from the audio content receiving component 202. The speech vocal content identifying component 204 may analyze speech patterns, cadences, and tone, which may imply confidence, empathy, kindness, or satisfaction, among many other metrics to generate speech vocal content. The speech vocal content identifying component 204 sends the speech vocal content to the transformation component 208.

The speech semantic content identifying component 206 receives the audio content from the audio content receiving component 202. The speech semantic content identifying component 206 may analyze the speech semantic content (what words were spoken) for clues as to how the conversation went against a trained set of metrics. The speech semantic content identifying component 206 sends the speech semantic content to the transformation component 208.

The transformation component 208 merges and combines the outputs of the speech vocal content identifying component 204 and the speech semantic content identifying component 206 into a large vector. This vector may densely encode important features of both paths. The transformation component 208 sends the combined vector to the model control structure generating component 210.

The model control structure generating component 210 receives the combined vector from the transformation component 208. The model control structure generating component 210 may be a dense neural network (DNN), or any other common machine learning technique. The combined information may be integrated into a model control structure. The model control structure may be a multi-modal model control structure. The model control structure is sent to the weighting component 212.

The idiosyncratic audio content identifying component 214 receives the audio content from the audio content receiving component 202. The idiosyncratic audio content identifying component 214 may utilize several methods when analyzing audio content to determine at how common or rare the audio content may be (e.g., does the audio content contain unusual words or phrases, is the audio content noteworthy). The idiosyncratic audio content identifying component 214 sends the idiosyncratic audio content to the similar audio content identifying component 216.

The similar audio content identifying component 216 receives the idiosyncratic audio content from the idiosyncratic audio content identifying component 214. In cases where the audio content may be designated to be a poor fit for the direct call grading in isolation, the similar audio content identifying component 216 may utilize a matching technique may be used to compare the audio content against similar audio content. This may be performed by extracting the word embedded vectors of the audio content into a matrix, and optionally combining audio content features (e.g., special features, signal intensity, variance, etc.) along with the word embeddings. This forms a large matrix representing the audio content. The one or more stored audio content files may be stored as a matrix or some indexed set of features such that matching may be quickly performed. Matching algorithms include euclidean or cosine distance, minimum flow, or distance along a space filling curve (i.e., a Hilbert curve). These matching algorithms may have a low- and high-fidelity step such that the majority of audio content may be filtered, rather than performing a linear search. The similar audio content identifying component 216 sends the similar audio content to the predictive metric control extraction component 218.

The predictive metric control extraction component 218 receives the similar audio content from the similar audio content identifying component 216. When an audio content is matched with a similar audio content, the predictive metric control extraction component 218 may extract the labels and annotations on the similar audio content (i.e., the predictive metric control). The predictive metric control is sent to the weighting component 212.

The weighting component 212 receives the model control structure from the model control structure generating component 210 and the predictive metric control from the predictive metric control extraction component 218. The weighting component 212 may average the similar audio content into the predicted call grade generated by the model control structure. The weighting component 212 sends the weighted model control structure to the model control structure sending component 220.

A noteworthiness metric may be used to decides the weighting in the average. This system may be primarily unsupervised, and improves with the number of examples. This increases the serendipitous similarity of the most-similar audio content.

Once direct call grading and call similarity have been trained with a sufficiently large dataset, they may accurately replicate human grading. The two systems complement each other, as they excel at opposite ends of the idiosyncratic spectrum. As both systems produce outputs on the same scale (the former producing a vector estimating the result of a human response and the latter finding a human response from similar audio content), they may be combined in a weighted average by the weighting component 212.

Where an audio content lies on the idiosyncratic spectrum may be estimated using call similarity. The similarity distance between the target audio content and a small set of randomly sampled audio content files may be computed. The higher the average match (lower distance to chosen audio content), the less idiosyncratic the audio content may be, and, therefore, the more weight may be placed on similarity.

If the average similarity match (higher is less distinct) over the random sample of audio content is:

$$\sigma \in (0.0, 1.0) \qquad \text{Average Similarity}$$

then the weighted average computed is:

$$g = \sigma d + (1.0 - \sigma)s \qquad \text{Weighted Average}$$

where g is the call grade, d is the result of sending the audio content and the transcript of the audio content through the direct call grading neural network, and s is the grade from the similar audio content in the similarity system.

While training the system may require large amounts of data and computation, running direct grading may typically be relatively quick. Call similarity may perform many matrix to matrix distance calculations between the audio content and the one or more stored audio content files and, therefore, may take longer to query than to train.

In one example implementation, direct call grading may be implemented using state of the art speech recognition, word embedding shallow neural networks, and a multi-modal long short-term memory (LSTM) recurrent neural network (RNN). Call similarity may be performed by embedding the sequence of words into a sequence of vectors, with several signal features (i.e., energy, variance, spectral coefficients) appended to the word embedding. The distance function between two similarity matrices may minimize the distance between paired word/signal vectors.

The model control structure sending component 220 receives the weighted model control structure from the weighting component 212. The model control structure sending component 220 may output the weighted model control structure as a vector of results, which may reproduce custom metrics (e.g., empathy, success, trust, competence), survey results (e.g., "On a scale of 1 to 5, how well did the agent resolve your issue?"), or other predictive analytics (e.g., future purchases, customer value, gender, demography). The weighted model control structure may also be sent as a feedback control to influence the creation of future audio records.

Figure 8:
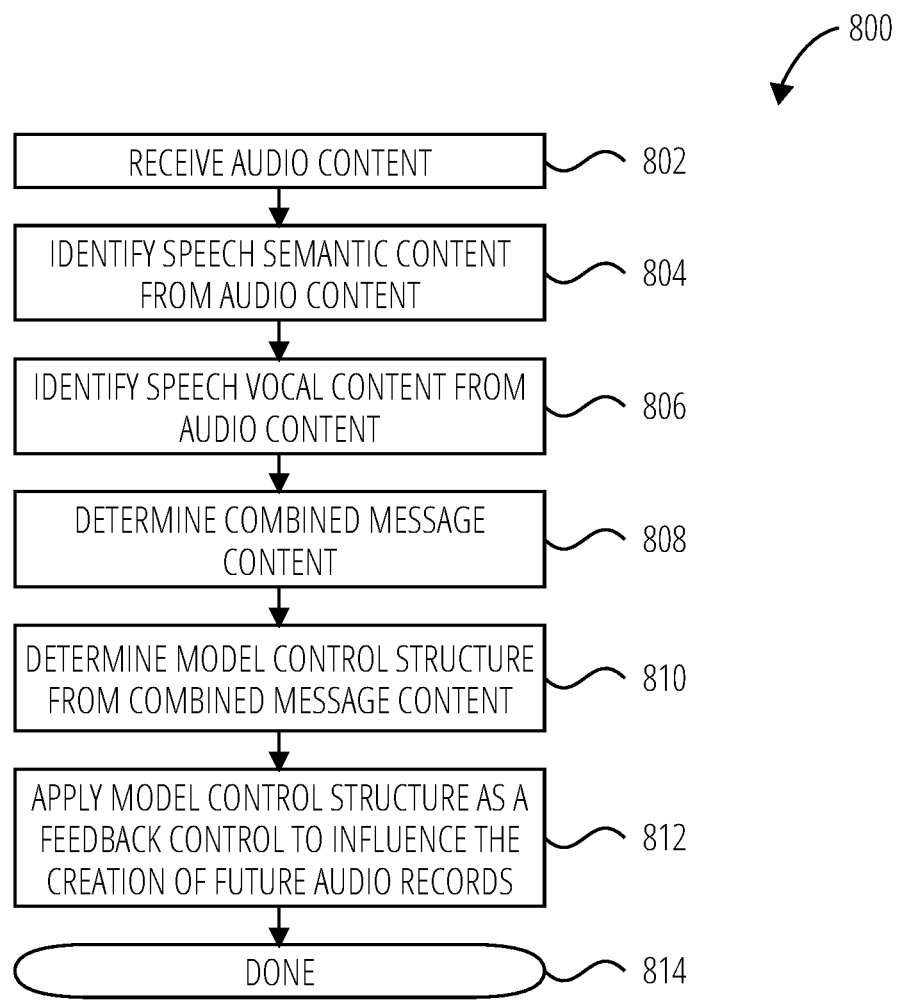
FIG. 8 illustrates an embodiment of an audio analysis process 800.
Figure 9:
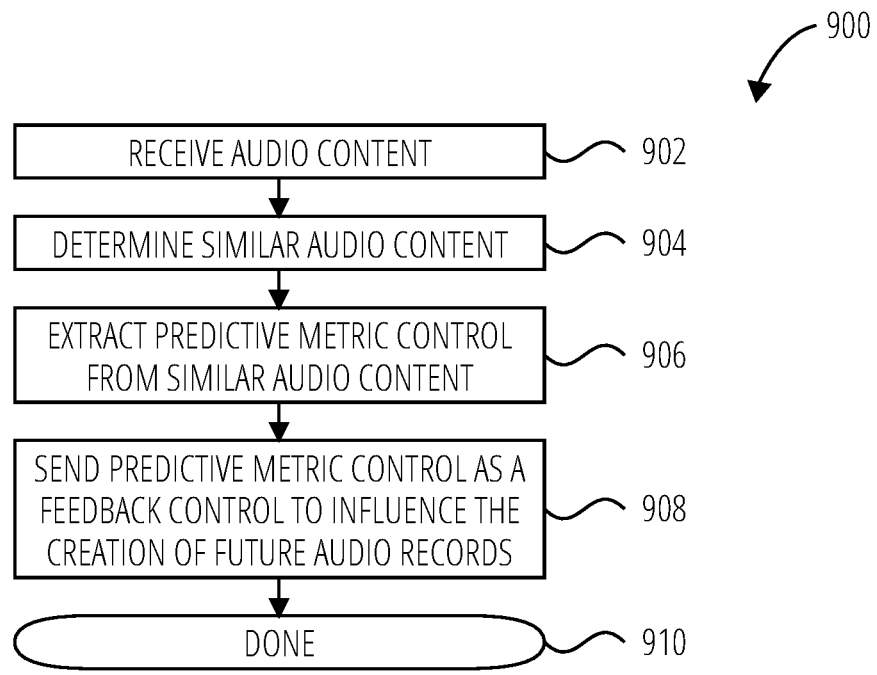
FIG. 9 illustrates an embodiment of an audio analysis process 900.

The audio analysis system 200 may be operated in accordance with the processes describe in FIG. 8 and FIG. 9.

Figure 3:
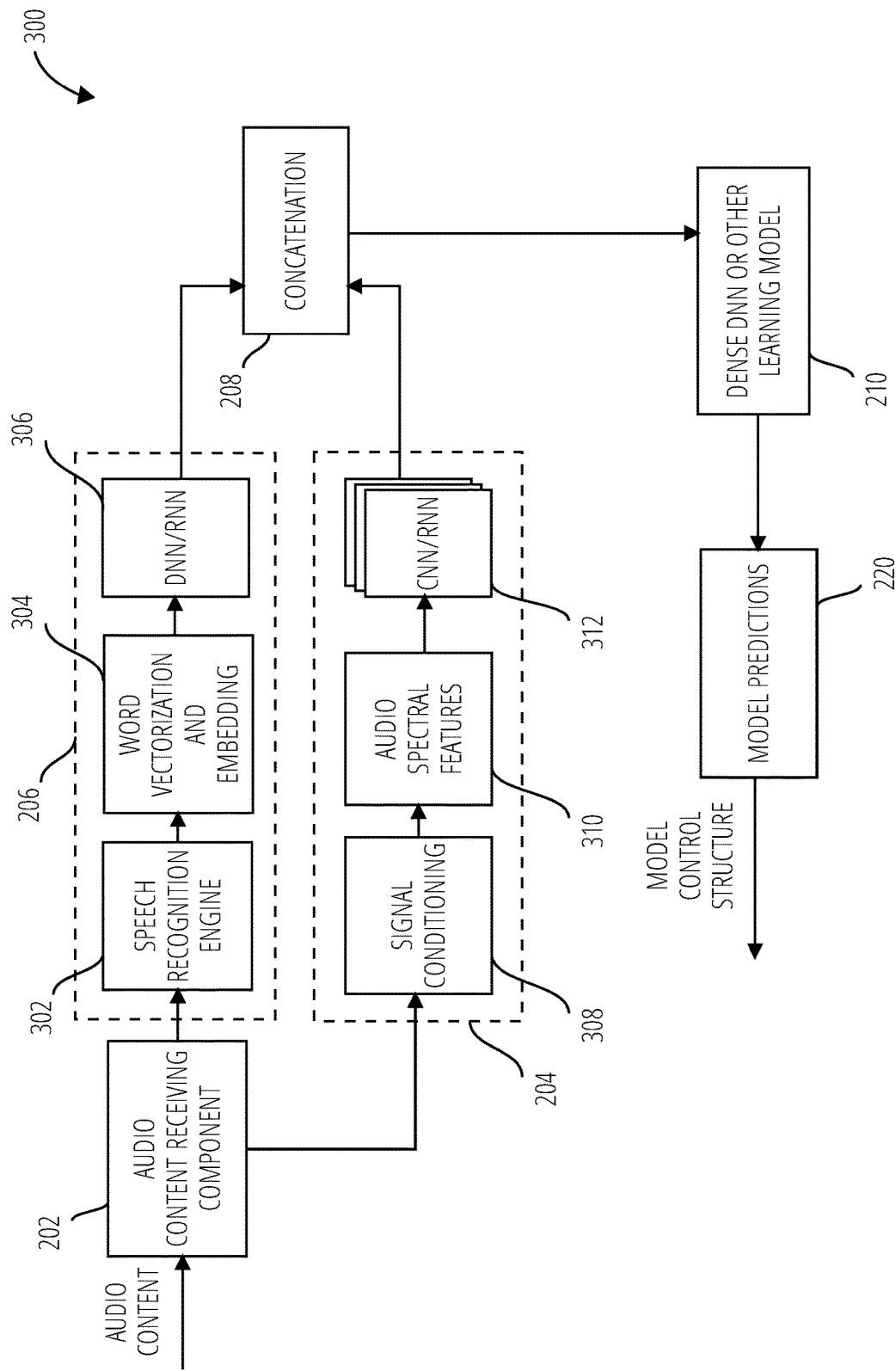
FIG. 3 illustrates an embodiment of an audio analysis system 300.

Referring to FIG. 3, the audio analysis system 300 comprises an audio content receiving component 202, a speech vocal content identifying component 204, a speech semantic content identifying component 206, a transformation component 208, a model control structure generating component 210, and a model control structure sending component 220. The speech vocal content identifying component 204 may further comprise a signal conditioning component 308, an audio spectral features component 310, and a CNN/RNN component 312. The speech vocal speech semantic content identifying component 206 may further comprise a speech recognition engine component 302, a word vectorization and embedding component 304, and a DNN/RNN component 306.

The audio content receiving component 202 receives the audio content and sends the audio content to the speech recognition engine component 302 and the signal conditioning component 308.

The speech recognition engine component 302 receives the audio content from the audio content receiving component 202. The speech recognition engine component 302 transcribes the audio content. The transcribed audio content is sent to the word vectorization and embedding component 304.

The word vectorization and embedding component 304 receives the transcribed audio content from the speech recognition engine component 302. The word vectorization and embedding component 304 vectorizes the words in the transcribed audio content and embeds them into a lower dimensional vector space. Many different methods may be used to transform text to a denser vector space including matrix methods, logistic regression, and neural networks. The audio speech recognition step and vectorization steps are trained on larger corpuses of general speech or text. The transcribed and vectorized audio content is sent to the DNN/RNN component 306.

The DNN/RNN component 306 receives the transcribed and vectorized audio content from the word vectorization and embedding component 304. The DNN/RNN component 306 is the speech portion of call grading. The DNN/RNN component 306 may include hand-designed heuristics, regression models, Bayesian models, latent Dirichlet allocation (LDA), latent semantic indexing (LSI), decision trees, decision forests, support vector machines, or a neural network, with or without recurrent units. The DNN/RNN component 306 may have a slot to emphasize a portion of the audio content. The DNN/RNN component 306 may be trained to emphasize this portion or may receive an input with instructions to do so. The portion may be fixed or based on the size of the audio content. For example, the portion emphasized may be the final thirty seconds of the audio content. The DNN/RNN component 306 sends the speech semantic content to the transformation component 208.

The signal conditioning component 308 receives the audio content from the audio content receiving component 202. The signal conditioning component 308 conditions the audio content to better isolate or prepare the audio content. This may include de-reverberation, noise removal, normalization, distortion correction, beam-forming, mixing, frequency-depending filtering, or any other digital signal processing methods that prepares the audio content for the downstream processing. The signal conditioning component 308 sends the conditioned audio content to the audio spectral features component 310.

The audio spectral features component 310 receives the conditioned audio content from the signal conditioning component 308. The audio spectral features component 310 processes the conditioned audio content with a feature extractor to generate spectrograms or some other spectral features. The features may be a 2D array of time-frequency data. The signal conditioning component 308 sends the extracted features to the CNN/RNN component 312.

The CNN/RNN component 312 receives the extracted features from the audio spectral features component 310. The CNN/RNN component 312 may be a one- or two-dimensional convolutional neural network (CNN), an ordinary stacked neural network (with or without recurrent units), matrix models, hand-designed heuristics, decision trees, decision forests, support vector machines, or any other machine learning model that may examine a time and/or frequency domain signal. While the diagram here shows a choice of neural networks in the speech- and audio-path, one or several other statistical learning methods may be combined. The CNN/RNN component 312 generates the speech vocal content and sends the speech vocal content to the transformation component 208.

The transformation component 208 receives the speech semantic content from the DNN/RNN component 306 and the speech vocal content from the CNN/RNN component 312. The transformation component 208 concatenates the speech semantic content and the speech vocal content into a combined vector and sends the combined vector to the model control structure generating component 210.

The model control structure generating component 210 receives the combined vector from the transformation component 208. The model control structure generating component 210 may be a dense neural network, or any other common machine learning technique. At this stage, the combined information may be integrated into a model control structure. The model control structure is sent to the model control structure sending component 220.

The model control structure sending component 220 receives the model control structure from the model control structure generating component 210, generates model prediction controls, and sends model prediction controls to drive a machine state of one or more machines. The model control structure may be applied as a feedback control to influence the creation of future audio records.

The audio analysis system 300 may be operated in accordance with the processes describe in FIG. 8 and FIG. 9.

Figure 4:
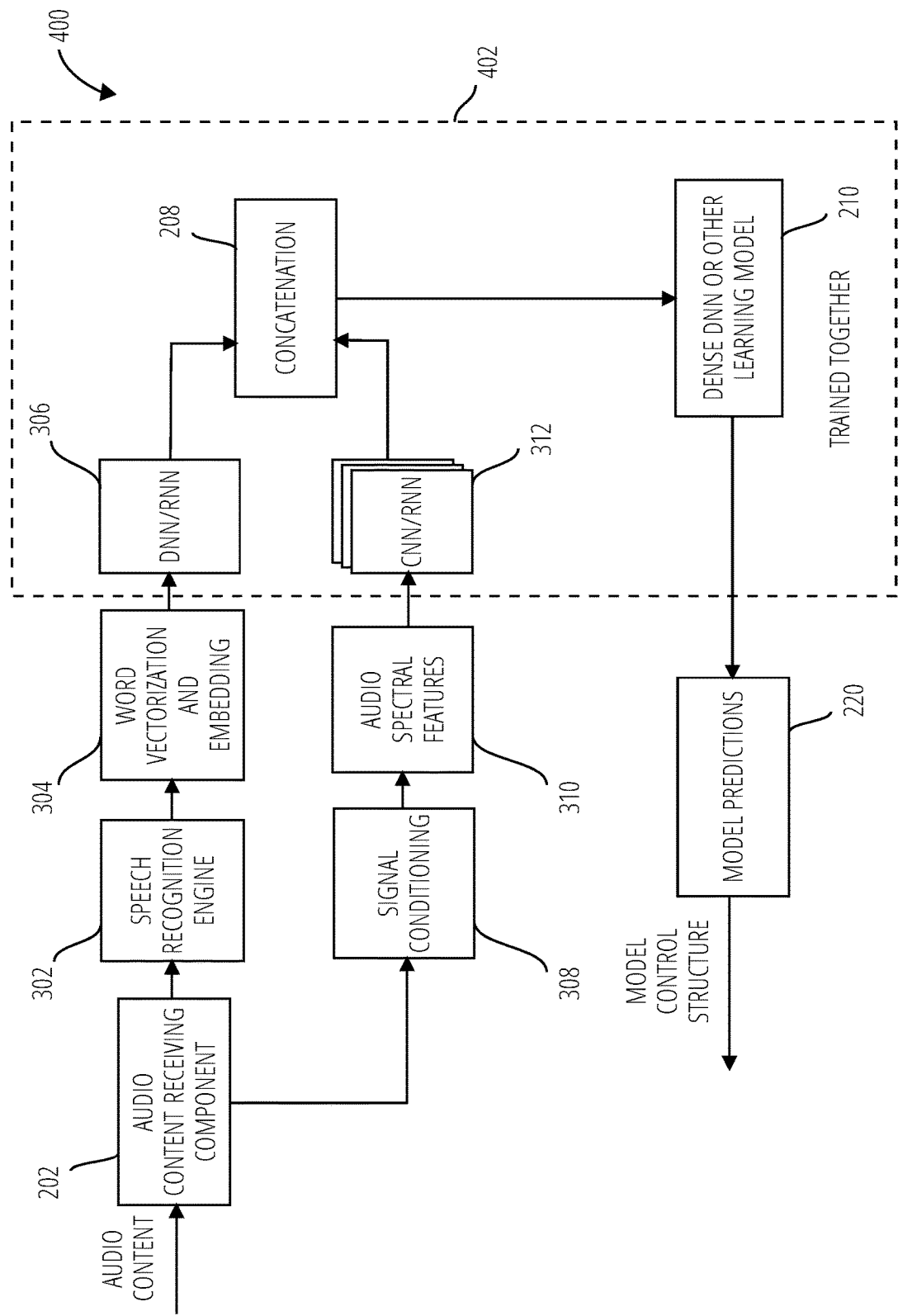
FIG. 4 illustrates an embodiment of an audio analysis system 400.

Referring to FIG. 4, the audio analysis system 400 comprises an audio content receiving component 202, a model control structure sending component 220, a speech recognition engine component 302, a word vectorization and embedding component 304, a signal conditioning component 308, an audio spectral features component 310, and a call grading training component 402. The call grading training component 402 may further comprise a transformation component 208, a model control structure generating component 210, a DNN/RNN component 306, and a CNN/RNN component 312.

The call grading training component 402 may be trained in a supervised manner using labelled pairs of audio recordings and desired model outputs. Portions of the model are either hard coded or trained on generic data. Depending on the complexity of the model and the quality of the audio data, the model may take variously sized datasets to train. Complex models may take tens of thousands of conversations to reach target accuracy. Once the model is fully-trained, it can be used as a replacement for manual human grading of calls, in some cases at human-level accuracy.

The audio analysis system 400 may be operated in accordance with the processes describe in FIG. 8 and FIG. 9.

Figure 5:
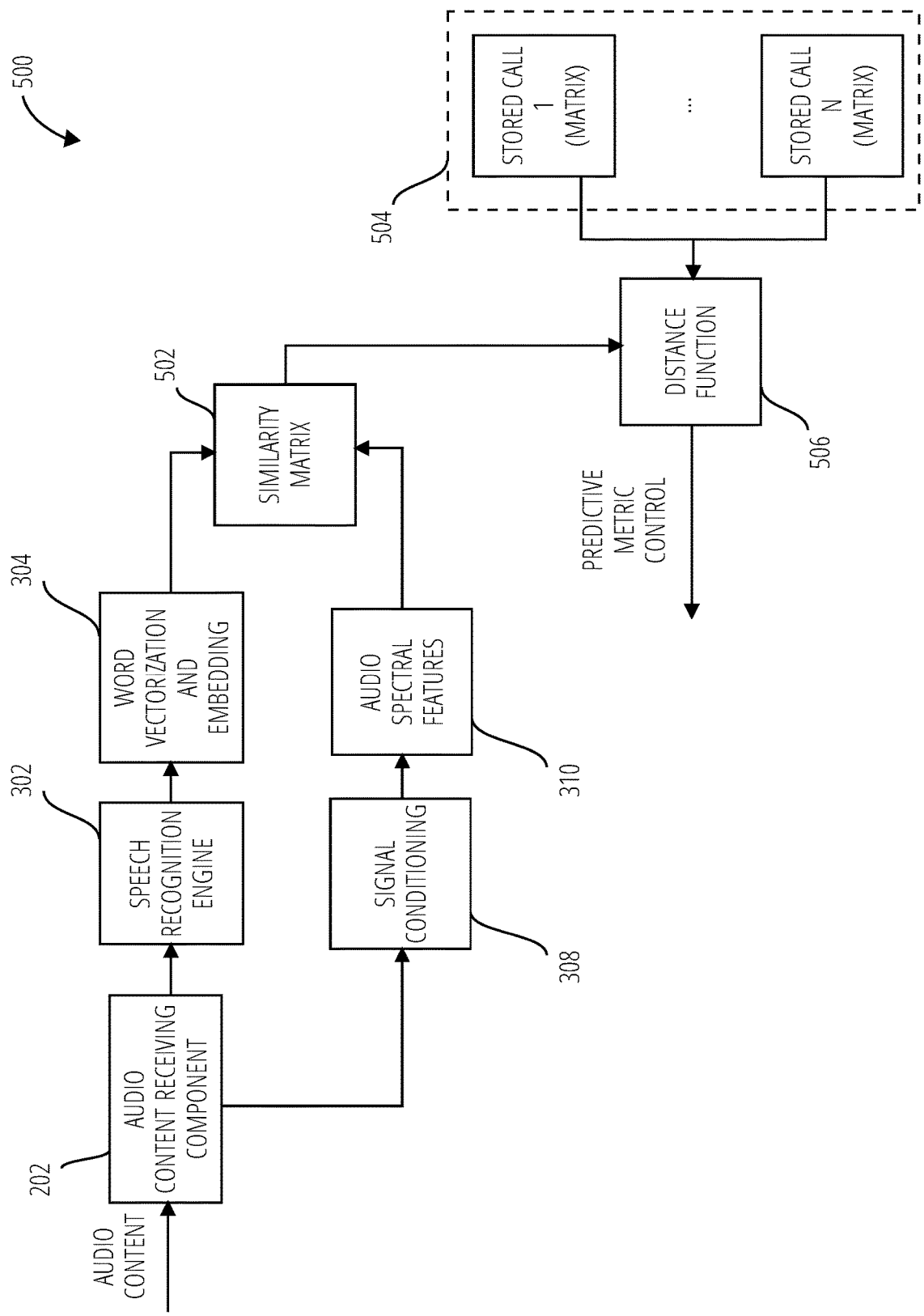
FIG. 5 illustrates an embodiment of an audio analysis system 500.

Referring to FIG. 5, the audio analysis system 500 comprises an audio content receiving component 202, a speech recognition engine component 302, a word vectorization and embedding component 304, a signal conditioning component 308, an audio spectral features component 310, a similarity matrix component 502, a one or more stored audio content files 504, and a distance function generating component 506.

The audio content receiving component 202, the speech recognition engine component 302, the word vectorization and embedding component 304, the signal conditioning component 308, and the audio spectral features component 310 operate as described above. The word vectorization and embedding component 304 sends the transcribed and vectorized audio content to the similarity matrix component 502. The audio spectral features component 310 sends the extracted features to the similarity matrix component 502.

The similarity matrix component 502 receives the transcribed and vectorized audio content from the word vectorization and embedding component 304 and the extracted features from the audio spectral features component 310. The similarity matrix component 502 concatenates the vectorized audio content and the extracted features into an audio content matrix that represents the audio content. The similarity matrix component 502 sends the audio content matrix to the distance function generating component 506.

The one or more stored audio content files 504 may be formatted as a series of matrices. Each of the one or more stored audio content files 504 may represent previous audio content that has been indexed with a set of features.

The distance function generating component 506 receives the audio content matrix. The distance function generating component 506 compares the audio content matrix to the one or more stored audio content files 504. Matching algorithms include euclidean or cosine distance, minimum flow, or distance along a space filling curve (i.e., a Hilbert curve). These matching algorithms may have a low- and high-fidelity step so that the majority of calls may be filtered, rather than performing a linear search. When an audio content matrix is matched with one of the one or more stored audio content files 504, the labels and annotations on the matched one or more stored audio content files 504 are transformed into a predictive metric control. The predictive metric control may be applied as a feedback control to influence the creation of future audio records.

The audio analysis system 500 may be operated in accordance with the processes describe in FIG. 8 and FIG. 9.

Figure 6:
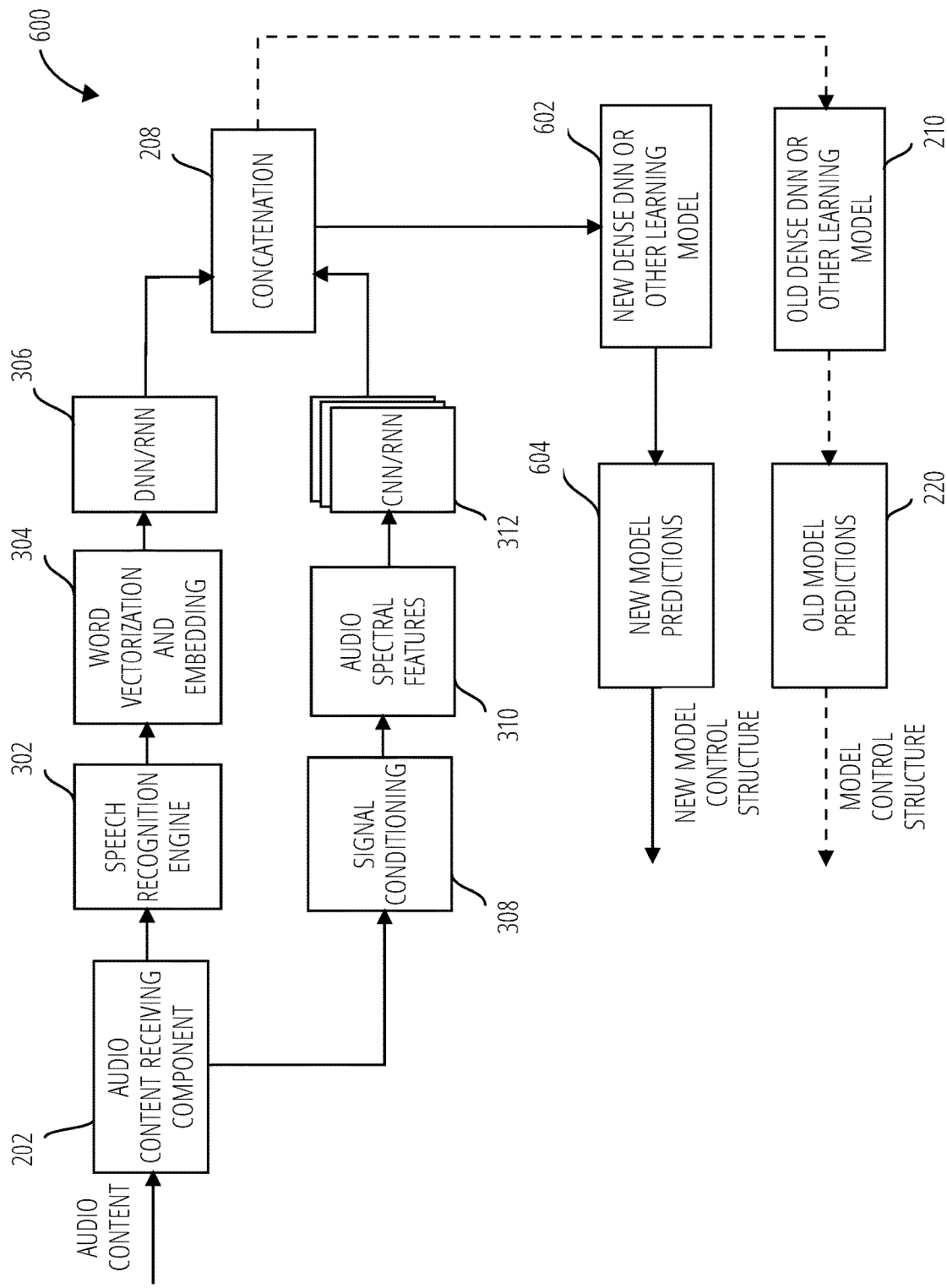
FIG. 6 illustrates an embodiment of an audio analysis system 600.

Referring to FIG. 6, the audio analysis system 600 comprises an audio content receiving component 202, a transformation component 208, a model control structure generating component 210, a model control structure sending component 220, a speech recognition engine component 302, a word vectorization and embedding component 304, a DNN/RNN component 306, a signal conditioning component 308, an audio spectral features component 310, a CNN/RNN component 312, a new model control structure generating component 602, and a new model control structure sending component 604.

The audio analysis system 600 may be retrained to utilize the new model control structure generating component 602 and the new model control structure sending component 604 in place of the model control structure generating component 210 and the model control structure sending component 220.

In some embodiments, the new model control structure generating component 602 and the new model control structure sending component 604 may be utilized with the model control structure generating component 210 and the model control structure sending component 220, providing multiple output controls. The audio analysis system 600 may utilized one or more of the new model control structure generating component 602 and the new model control structure sending component 604, each generating a new model control structure. The new model control structures and the model control structure may be further combined into multi-modal model control structure. Each model control structure may be weighted prior to being combined. The multi-modal weight may be based on the correlation of each model control structure to the other model control structures. A model control structure with a high correlation with other model control structures may be weighted lower than a model control structure with a low correlation with other model control structures. The correlation, and thus the multi-modal weights, may be pre-determined based on operating the model control structures with training audio content.

In other embodiments, new DNN/RNN component 306 and new CNN/RNN component 312 may be utilized. These new DNN/RNN component 306 and new CNN/RNN component 312 may be similarly weighted by the transformation component 208 to generate a multi-modal model control structure, where components with higher correlations to other components are weighted less than those with lower correlations to other components. The correlation, and thus the multi-modal weights, may be pre-determined based on operating the components with training audio content.

Audio analysis system 600 may be operated in accordance with the processes describe in FIG. 8 and FIG. 9.

Figure 7:
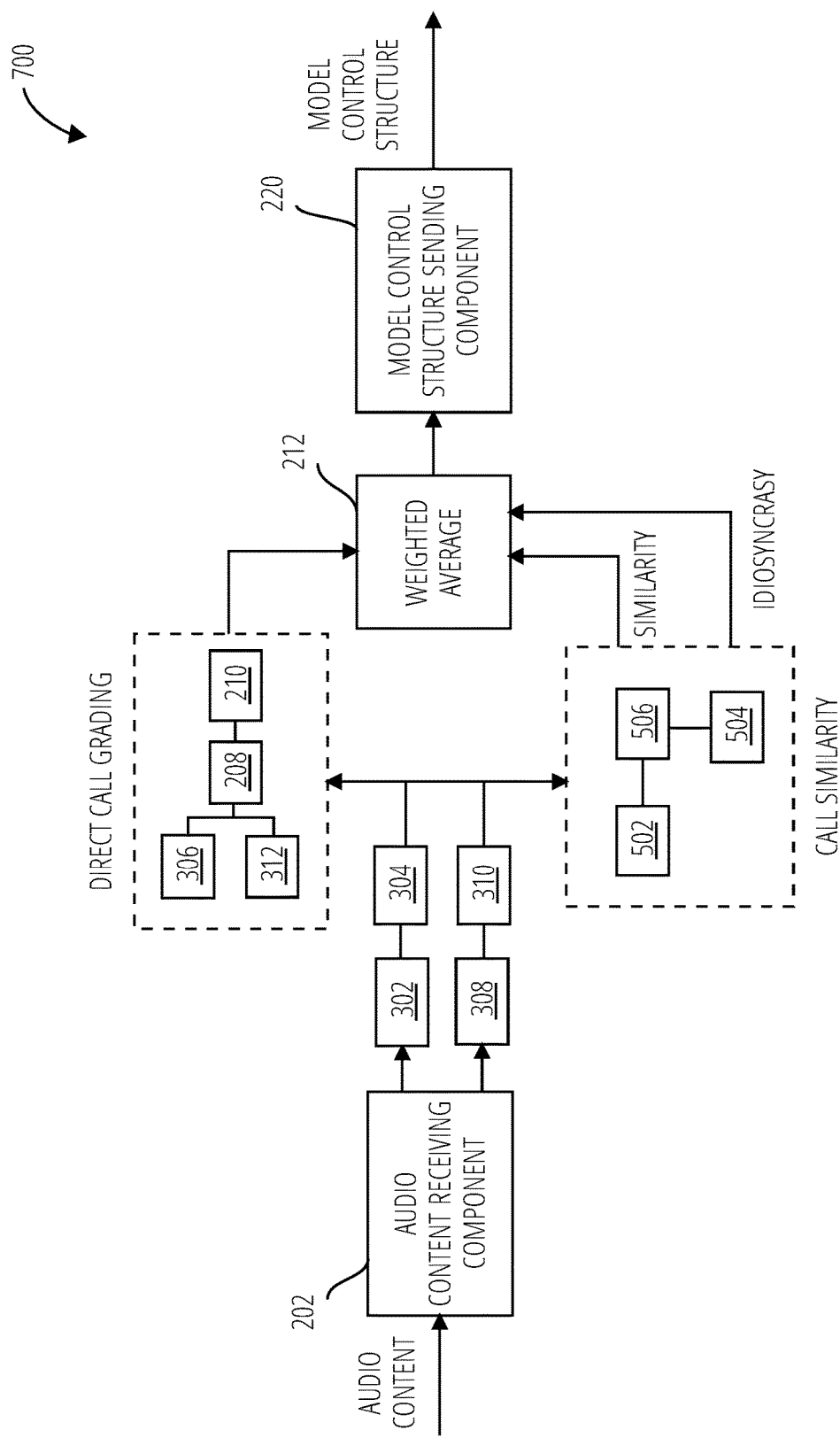
FIG. 7 illustrates an embodiment of an audio analysis system 700.

Referring to FIG. 7, the audio analysis system 700 comprises an audio content receiving component 202, a transformation component 208, a model control structure generating component 210, a weighting component 212, a model control structure sending component 220, a speech recognition engine component 302, a word vectorization and embedding component 304, a DNN/RNN component 306, a signal conditioning component 308, an audio spectral features component 310, a CNN/RNN component 312, a similarity matrix component 502, a one or more stored audio content files 504, and a distance function generating component 506.

The audio content receiving component 202 receives the audio content and sends the audio content to the speech recognition engine component 302 and the signal conditioning component 308.

The speech recognition engine component 302, the word vectorization and embedding component 304, the signal conditioning component 308, and the audio spectral features component 310 process the audio content and send to the direct call grading components (i.e., the DNN/RNN component 306, the CNN/RNN component 312, the transformation component 208, and the model control structure generating component 210) and the call similarity components (i.e., the similarity matrix component 502, the one or more stored audio content files 504, and the distance function generating component 506).

The direct call grading components generate a multi-modal model control structure and send the multi-modal model control structure to the weighting component 212.

The call similarity components generate a predictive metric control. The predictive metric control may comprise a measure of similarity and idiosyncrasy of the audio content. The predictive metric control is sent to the weighting component 212.

The weighting component 212 generates a weighted model control structure from the multi-modal model control structure and the predictive metric control and sends the weighted model control structure to the model control structure sending component 220.

The model control structure sending component 220 generates a model control structure. The model control structure may be applied as a feedback control to influence the creation of future audio records.

The audio analysis system 700 may be operated in accordance with the processes describe in FIG. 8 and FIG. 9.

Referring to FIG. 8, the the audio analysis process 800 receives audio content (block 802). The speech semantic content is identified from the audio content (block 804). The speech vocal content is identified from the audio content (block 806). The combined message content id determined (block 808). The combined message content is a transformation of the speech semantic content and the speech vocal content. The model control structure is determined from the combined message content (block 810). The model control structure is applied as a feedback control to influence the creation of future audio records (block 812). The audio analysis process 800 then ends (done block 814).

The audio analysis process 800 receives audio signals and generates controls to drive the machine state of one or more machines. The model control structure may be a grade of the audio content, the one or more machines comprising a machine display, the machine display altered to display the grade.

The audio analysis process 800 may perform a subroutine comprising determining the similar audio content, the similar audio content selected from one or more stored audio content files by comparing the audio content to the one or more stored audio content files; extracting a predictive metric control from the similar audio content; determining a weighted model control structure by combining the predictive metric control with the model control structure; and sending the weighted model control structure to affect the machine state of the one or more machines. During determining the similar audio content from the one or more stored audio content files, a tree structure may be utilized to reduce the number of comparisons between the audio content and the one or more stored audio content files. The tree structure may comprise a indication of the similarity among the one or more stored audio content files. As the audio content is compared to one of the one or more stored audio content files, the remaining one or more stored audio content files are filtered based on their relationship to the one compared to the audio content. The other one or more stored audio content files may be filtered if the comparison indicates similarity and the relationship indicates dissimilarity or the comparison indicates dissimilarity and the relationship indicates similarity. The unfiltered one or more stored audio content files may be compared with the audio content or may be further filtered based on further similarity and relationships. Additionally, other data culling techniques may be utilized. The subroutine may be performed for all data sets of one or more stored audio content files. The subroutine may also be performed for data sets below a pre-determined content files size. The subroutine may also determine the audio content to be idiosyncratic audio content and performing the other steps in response to the audio content being idiosyncratic audio content. The audio content may be compared to a pre-determined list of idiosyncratic terms comprising unusual words or phrases or other noteworthy characteristics, which if detected would activate the subroutine.

The audio analysis process 800 may be operated multiple times. After each operation, a confidence value may be calculated that associated with the grade for each portion of the audio content (e.g., for each second). Each operation of the audio analysis process 800 on the audio content may be averaged with the previous operations of the audio analysis process 800 on the audio content. Once the confidence value is greater than a pre-determined threshold value, the audio analysis process 800 is not operated on the audio content. The output controls may operate a machine display to display the plurality of grades for each of a plurality of segments of the audio content. The audio analysis process 800 may then determine the speech semantic content and the speech vocal content associated with a change in the grade. The audio analysis process 800 may determine those that exceed a threshold value of change.

Referring to FIG. 9, the audio analysis process 900 receives the audio content (block 902). The similar audio content is determined (block 904). The similar audio content is selected from one or more stored audio content files by comparing the audio content to the one or more stored audio content files. A predictive metric control is extracted from the similar audio content (block 906). The predictive metric control is sent as a feedback control to influence the creation of future audio records (block 908). The audio analysis process 900 ends (done block 910).

The audio analysis process 900 receives audio signals and generates controls to affect the machine state of one or more machines. The predictive metric control may be a grade of the audio content, the one or more machines comprising a machine display, the machine display altered to display the grade.

During determining the similar audio content from the one or more stored audio content files, the audio analysis process 900 may utilize a tree structure to reduce the number of comparisons between the audio content and the one or more stored audio content files. The tree structure may comprise a indication of the similarity among the one or more stored audio content files. As the audio content is compared to one of the one or more stored audio content files, the remaining one or more stored audio content files are filtered based on their relationship to the one compared to the audio content. The other one or more stored audio content files may be filtered if the comparison indicates similarity and the relationship indicates dissimilarity or the comparison indicates dissimilarity and the relationship indicates similarity. The unfiltered one or more stored audio content files may be compared with the audio content or may be further filtered based on further similarity and relationships. Additionally, other data culling techniques may be utilized.

The audio analysis process 900 may be performed for all data sets of one or more stored audio content files. The audio analysis process 900 may also be performed for data sets below a pre-determined content files size. The audio analysis process 900 may also determine the audio content to be idiosyncratic audio content and performing the other steps in response to the audio content being idiosyncratic audio content. The audio content may be compared to a pre-determined list of idiosyncratic terms comprising unusual words or phrases or other noteworthy characteristics, which if detected would activate the subroutine.

The audio analysis process 900 may be operated multiple times. After each operation, a confidence value may be calculated that associated with the grade for each of a plurality of segments of the audio content (e.g., for each second). Each operation of the audio analysis process 900 on the audio content may be averaged with the previous operations of the audio analysis process 900 on the audio content. Once the confidence value is greater than a pre-determined threshold value, the audio analysis process 900 is not operated on the audio content. The output controls may operate a machine display to display the plurality of grades for each of a plurality of segments of the audio content. The audio analysis process 900 may then determine the speech semantic content and the speech vocal content associated with a change in the grade. The audio analysis process 900 may determine those that exceed a threshold value of change.

Figure 10:
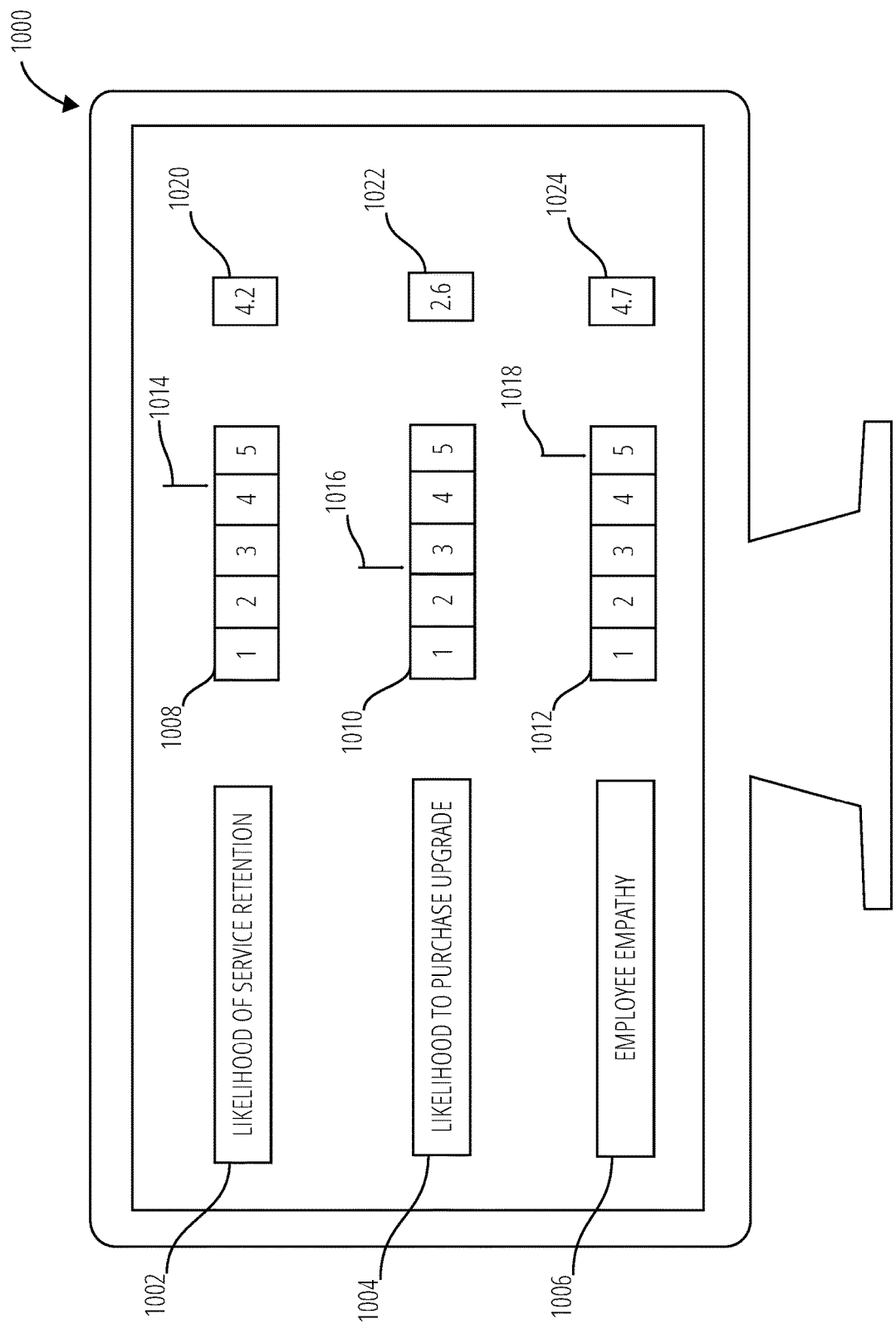
FIG. 10 illustrates an embodiment of an altered machine display 1000.

Referring to FIG. 10, the altered machine display 1000 comprises a first metric 1002, a second metric 1004, a third metric 1006, a first scale 1008, a second scale 1010, a third scale 1012, a first grade indication 1014, a second grade indication 1016, a third grade indication 1018, a first grade 1020, a second grade 1022, and a third grade 1024.

The altered machine display 1000 receives a model control structure (or weighted model control structure) and is altered to display one or more grades (i.e., the first grade 1020, the second grade 1022, and the third grade 1024).

The first metric 1002, the second metric 1004, and the third metric 1006 indicate what the model control structure is measuring. The first scale 1008, the second scale 1010, and the third scale 1012 indicate the range of the grades. The scale may be 1-5, a percentage, a binary "yes or no", etc. The first grade indication 1014, the second grade indication 1016, and the third grade indication 1018 depict where the grade is located on the respective scale. The first grade 1020, the second grade 1022, and the third grade 1024 depict the output of the audio analysis system 200 based on an audio content.

Figure 11:
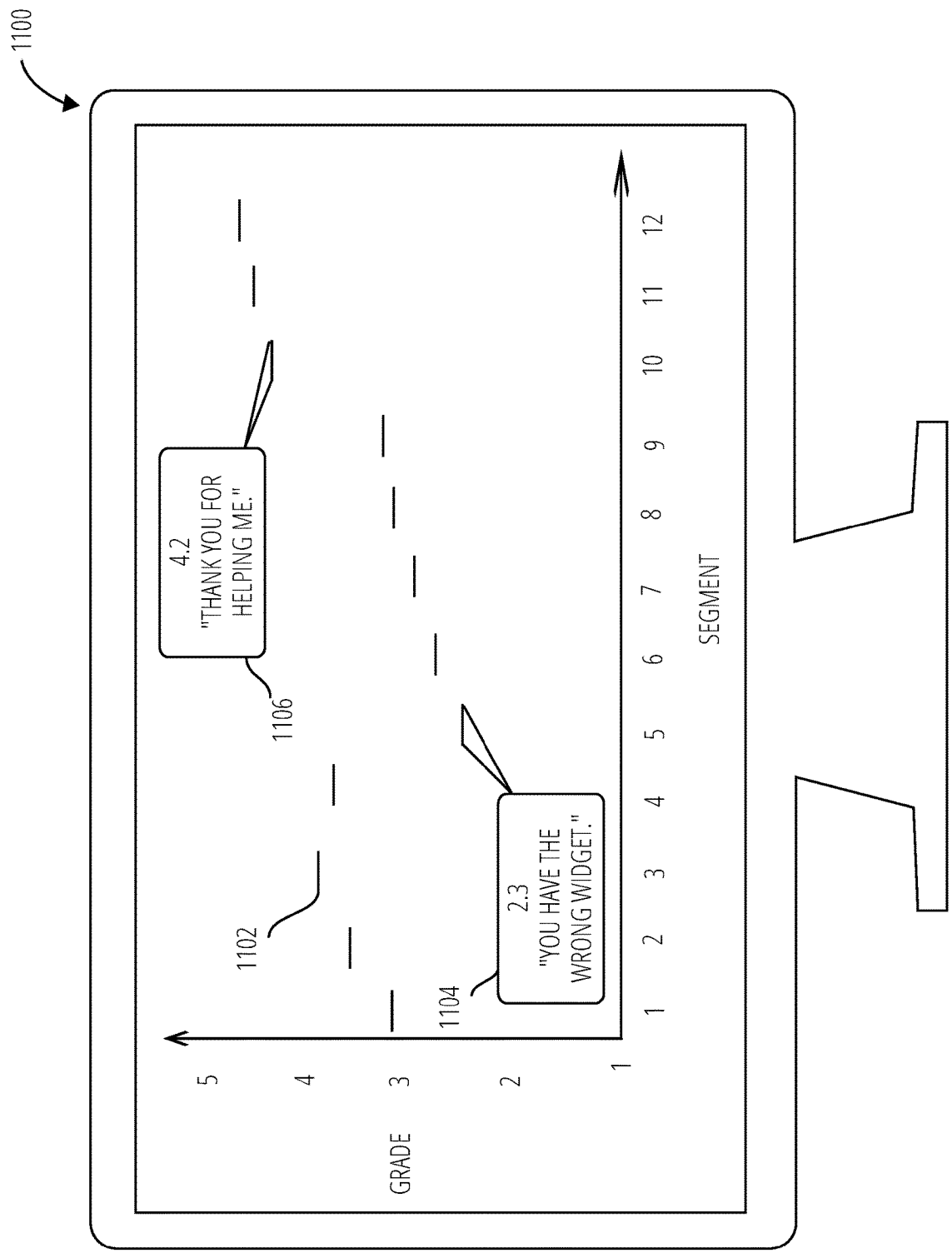
FIG. 11 illustrates an embodiment of an altered machine display 1100.

Referring to FIG. 11, the altered machine display 1100 comprises a grade indication 1102, a fifth segment detail 1104, and a tenth segment detail 1106.

The altered machine display 1100 depicts a plurality of grades associated with a plurality of segments of an audio content. Each segment may be a time interval of the audio content, and each time interval may have the same or different duration. The grade indication 1102 shows the grade for each segment. The fifth segment detail 1104 and the tenth segment detail 1106 may be displayed either when activated by an input from an input device, such as a computer mouse, touch screen, audio control, etc. The fifth segment detail 1104 and the tenth segment detail 1106 may be automatically display in response to the change in the grade being greater than a pre-determined grade threshold value. The fifth segment detail 1104 and the tenth segment detail 1106 may depict the grade (e.g., 2.3 and 4.2, respectively) and semantic content associated with the segment (e.g., "You have the wrong widget." and "Thank you for helping me.", respectively). Other speech semantic or vocal content may be displayed.

Figure 12:
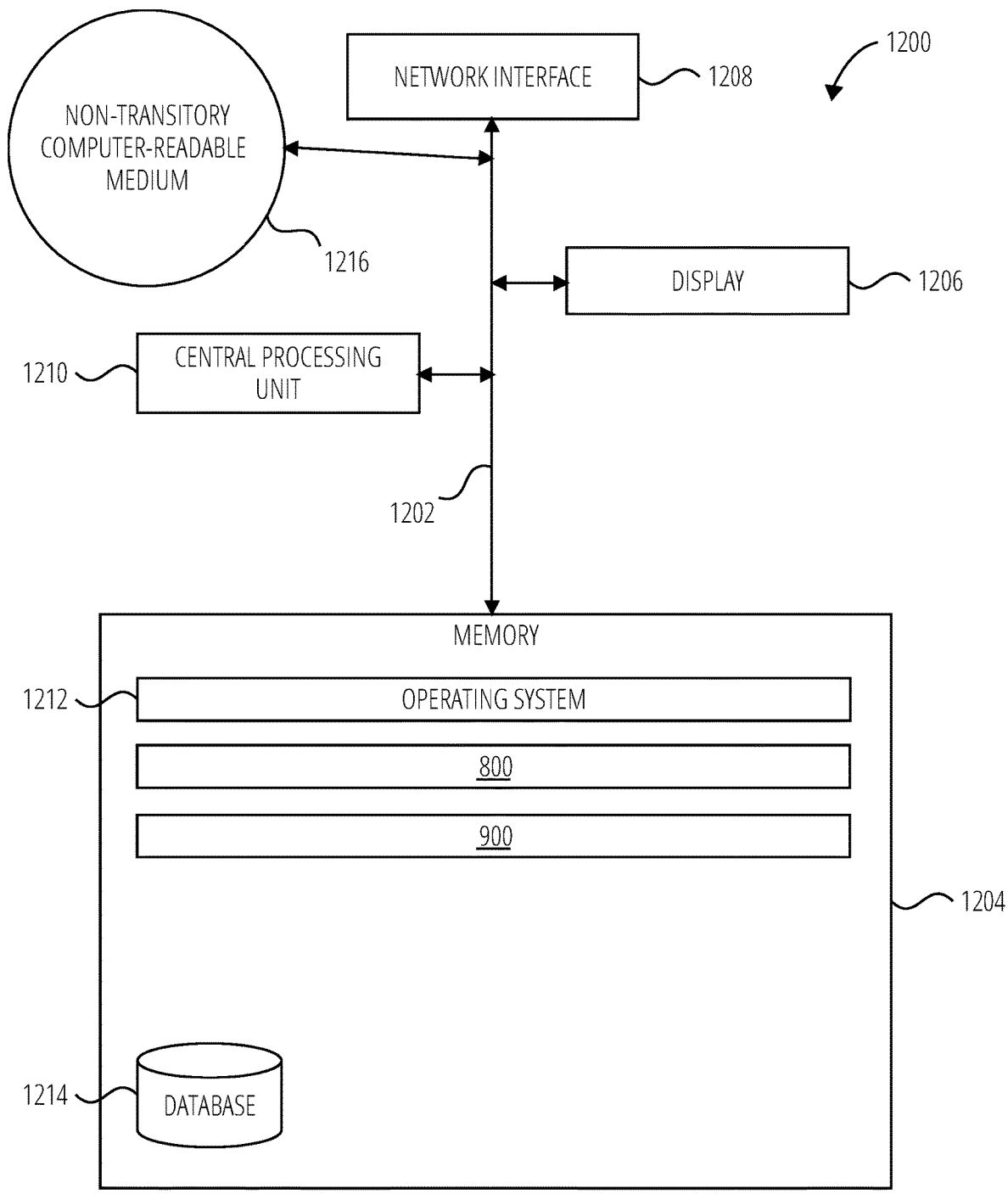
FIG. 12 illustrates a system 1200 in accordance with one embodiment.

FIG. 12 illustrates several components of an exemplary system 1200 in accordance with one embodiment. In various embodiments, system 1200 may include a desktop PC, server, workstation, mobile phone, laptop, tablet, set-top box, appliance, or other computing device that is capable of performing operations such as those described herein. In some embodiments, system 1200 may include many more components than those shown in FIG. 12. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1200 may comprise one or more physical and/or logical devices that collectively provide the functionalities described herein. In some embodiments, system 1200 may comprise one or more replicated and/or distributed physical or logical devices.

In some embodiments, system 1200 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1200 includes a bus 1202 interconnecting several components including a network interface 1208, a display 1206, a central processing unit 1210, and a memory 1204.

Memory 1204 generally comprises a random access memory ("RAM") and permanent non-transitory mass storage device, such as a hard disk drive or solid-state drive. Memory 1204 stores an operating system 1212.

These and other software components may be loaded into memory 1204 of system 1200 using a drive mechanism (not shown) associated with a non-transitory computer-readable medium 1216, such as a floppy disc, tape, DVD/CD-ROM drive, memory card, or the like.

Memory 1204 also includes database 1214. In some embodiments, system 1200 may communicate with database 1214 via network interface 1208, a storage area network ("SAN"), a high-speed serial bus, and/or via the other suitable communication technology.

In some embodiments, database 1214 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"Associator" in this context refers to a correlator (see the definition for Correlator).

"Audio content" in this context refers to a sound signal or recording comprising speech.

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Combiner" in this context refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; Other examples of combiners will be evident to those of skill in the art without undo experimentation.

"Comparator" in this context refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1==input2) output=val1; else if (input1>input2) output=val2; else output=val3; Many other examples of comparators will be evident to those of skill in the art, without undo experimentation.

"Confidence value" in this context refers to the frequency (i.e., the proportion) of confidence intervals that contain the true value of their corresponding parameter.

"Correlator" in this context refers to a logic element that identifies a configured association between its inputs. One examples of a correlator is a lookup table (LUT) configured in software or firmware. Correlators may be implemented as relational databases. An example LUT correlator is: low alarm condition |low_threshold_value|0| |safe_condition |safe_lower_bound |safe_upper_bound| |high_alarm_condition|high_threshold_value| 0 | Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Grade" in this context refers to a valuation of an aspect of an audio content.

"Idiosyncratic audio content" in this context refers to audio content that is dissimilar to the content utilized to train a model.

"Model control structure" in this context refers to an output from a model for a specific audio content.

"Multi-modal weight" in this context refers to a value applied to a model when utilized with other models.

"Plurality of segments" in this context refers to intervals of the audio content, each interval may or may not be equal in duration.

"Predictive metric control" in this context refers to labels and annotations associated with a similar audio content.

"Selector" in this context refers to a logic element that selects one of two or more inputs to its output as determined by one or more selection controls. Examples of hardware selectors are multiplexers and demultiplexers. An example software or firmware selector is: if (selection control==true) output=input1; else output=input2; Many other examples of selectors will be evident to those of skill in the art, without undo experimentation.

"Speech semantic content" in this context refers to words spoken in a audio content.

"Speech vocal content" in this context refers to characteristics, such as speech patterns, cadences, and tone, of an audio content.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A method of processing a current call on one more machines, the method comprising:
    receiving audio content for the current call;
    generating a first feature vector from the audio content representing speech semantic content of the current call;
    generating a second feature vector from the audio content representing speech vocal content of the current call;
    forming a combined feature vector by concatenating the first feature vector and the second feature vector;
    applying the combined feature vector as an input to a multi-modal direct call grading model to generate a plurality of direct call controls;
    generating a similarity matrix for the current call from the first feature vector and the second feature vector;
    applying the similarity matrix and a tree structure of feature matrices for prior calls to a distance function to generate an idiosyncratic call control and a similarity call control;
    weighting the direct call controls, ideosyncratic call control, and similarity call control to form a weighted call control model, wherein weights for the direct call controls model are based on an inter-correlation of a plurality of models utilized in the multi-modal direct call grading model, the weight increasing with decreasing correlation; and
    applying the weighted call control model as a feedback control to influence processing of future audio calls by the one or more machines.

2. The method of claim 1, wherein generating and applying the similarity matrix is performed in response to a set of the prior calls as recorded comprising less than a predetermined content file size.

3. A non-transitory computer-readable medium comprising instructions that when executed by a computer processor, result in:
    generating a first feature vector from audio content of a received call, the first feature vector representing speech semantic content of the current call;
    generating a second feature vector from the audio content representing speech vocal content of the current call;
    forming a combined feature vector by concatenating the first feature vector and the second feature vector;
    applying the combined feature vector as an input to a multi-modal direct call grading model to generate a plurality of direct call controls;
    generating a similarity matrix for the current call from the first feature vector and the second feature vector;
    applying the similarity matrix and a tree structure of feature matrices for prior calls to a distance function to generate an idiosyncratic call control and a similarity call control;
    weighting the direct call controls, ideosyncratic call control, and similarity call control to form a weighted call control model, wherein weights for the direct call controls model are based on an inter-correlation of a plurality of models utilized in the multi-modal direct call grading model, the weight increasing with decreasing correlation; and
    applying the weighted call control model as a feedback control to influence processing of future audio calls by the one or more machines.

4. The non-transitory computer-readable medium of claim 3, wherein generating and applying the similarity matrix is performed in response to a set of the prior calls as recorded comprising less than a pre-determined content file size.

\* \* \* \* \*